United States Patent
Shirane et al.

(10) Patent No.: US 6,410,188 B1
(45) Date of Patent: Jun. 25, 2002

(54) NON-AQUEOUS ELECTROLYTE SECONDARY CELL

(75) Inventors: Takayuki Shirane; Yoshiaki Nitta; Shuji Tsutsumi; Masaki Hasegawa, all of Osaka; Junichi Yamaura, Hyogo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/601,276

(22) PCT Filed: Nov. 29, 1999

(86) PCT No.: PCT/JP99/06644

§ 371 (c)(1),
(2), (4) Date: Sep. 11, 2000

(87) PCT Pub. No.: WO00/33399

PCT Pub. Date: Jun. 8, 2000

(30) Foreign Application Priority Data

Nov. 30, 1998 (JP) ............................................. 10-338740
Oct. 5, 1999 (JP) ............................................. 11-284387

(51) Int. Cl.$^7$ ............................................. H01M 10/24
(52) U.S. Cl. ................................. 429/231.95; 429/223
(58) Field of Search ............................. 429/231.95, 223

(56) References Cited

FOREIGN PATENT DOCUMENTS

| JP | 2-82447 | 3/1990 |
| JP | 3-112070 | 5/1991 |
| JP | 3-291862 | 12/1991 |
| JP | 6-325765 | 11/1994 |
| JP | 7-14580 | 1/1995 |
| JP | 7-78609 | 3/1995 |
| JP | 7-201318 | 8/1995 |
| JP | 7-230800 | 8/1995 |
| JP | 7-288123 | 10/1995 |
| JP | 8-138653 | 5/1996 |
| JP | 9-102313 | 4/1997 |
| JP | 9-147856 | 6/1997 |
| JP | 9-298068 | 11/1997 |
| JP | 10-302765 | 11/1998 |
| JP | 11-176471 | * 7/1999 ............ H01M/4/02 |

OTHER PUBLICATIONS

International Search Report corresponding to application No. PCT/JP99/06644 dated Feb. 29, 2000.

* cited by examiner

Primary Examiner—Gabrielle Brouillette
Assistant Examiner—Monique Wills
(74) Attorney, Agent, or Firm—Ratner & Prestia

(57) ABSTRACT

A non-aqueous electrolyte secondary battery using lithium containing composite oxide, which intercalates and de-intercalates lithium, for a positive electrode; and lithium containing composite nitride and a compound having a large irreversible capacity for a negative electrode. Metal oxide is used as a material for the negative electrode, and lithium containing composite nitride represented by the general formula of $Li_{3-x}M_xN$ (M is a transition metal, $0.2 < x \leq 0.8$) is also contained in the negative electrode. Lithium containing composite nitride containing cobalt as its transition metal M is further preferable because it has high capacity and good reversibility. For the positive electrode of the secondary battery, lithium containing composite oxide such as lithium cobaltate, lithium nickelate, their composite compound, and lithium manganate ($LiMn_2O_4$) may be used. High capacity and high quality non-aqueous electrolyte secondary battery with good cycle reversibility may be obtained by adding lithium containing composite nitride to the negative electrode.

4 Claims, 4 Drawing Sheets

NON-AQUEOUS ELECTROLYTE SECONDARY CELL

This Application is a U.S. National Phase Application of PCT International Application PCT/JP99/06644.

BACKGROUND OF THE INVENTION

1. Field of the Invention

The present invention relates to the field of secondary batteries employing non-aqueous electrolytes which have good charge-discharge cycle characteristics and high discharge capacity, and more particularly to active materials for the negative electrode of secondary batteries employing lithium containing composite oxides such as lithium cobaltate ($LiCoO_2$) and lithium nickelate ($LiNiO_2$) for the positive electrode.

2. Description of the Prior Art

Typical active materials used for the negative electrode of non-aqueous secondary batteries (hereafter referred to as secondary batteries) are metallic lithium and lithium alloy. However, secondary batteries using metallic lithium as the negative electrode have not yet been put to practical use due to internal short-circuiting caused by dendritic growth of lithium on the negative electrode, or danger of fire by activation of the dendrite of lithium itself. A range of secondary batteries using lithium alloy have also been proposed, but these secondary batteries also have yet to be put into practical use due to the problem of disintegration into powder of the alloy electrodes during charge-discharge cycles, resulting in insufficient cycle reversibility. On the other hand, lithium ion secondary batteries using carbon materials as the negative electrode, such as graphite, which can reversibly intercalate and de-intercalate lithium, have been successfully put into practical use. The marketed type of lithium ion secondary battery employs the lithium containing composite oxide $LiCoO_2$ for the positive electrode, and the lithium ions contained in the positive electrode at the beginning are reversibly intercalated and de-intercalated with the carbon material in the negative electrode during the charge-discharge cycles.

Compounds with this function other than $LiCoO_2$, including $LiNiO_2$, $LiMn_2O_4$, and their composite oxides, can also be used as the positive electrode in the lithium ion secondary battery. These compounds are suitable active materials having about +4 V higher electrode potential than that of metallic lithium; and they also feature a large reversible capacity, making high voltage and higher capacity feasible.

On the other hand, although the carbon material used for the negative electrode is regarded as having a large capacity, a theoretical charge-discharge capacity of 370 mAh/g is the upper limit even for the most commonly adopted graphite. The use of compounds other than carbon materials for the negative electrode, particularly combined with lithium containing composite oxide for the positive electrode, has the potential for increasing the capacity of lithium ion secondary batteries.

The use of metal oxides allows the realization of extremely high capacity, and an electrode material demonstrating a charge-discharge capacity greater than 1000 mAh/g has already been reported. Proposals made on the use of oxides for the negative electrode, which may promise high capacity, include tungsten oxide and lithium containing iron oxides (Japanese Patent Laid-open Publication No. H3-112070), niobium oxide (No. H2-82447), iron oxide and cobalt oxide (No. H3-291862), lithium containing silicon oxide (No. H6-325765), oxides containing vanadium (No. H7-14580), composite oxides containing tin, germanium or silicon (No. H7-201318), and amorphous oxides containing tin, lead, or silicon (No. H7-288123).

Recently, the use of lithium nitride metal compounds (lithium containing composite nitrides) has also been disclosed (No. H7-78609) as an electrode material for an electrochemical element.

However, most of these metal oxides show large irreversible capacity, although they have high capacity, when they are used for the negative electrode of the secondary battery. This disadvantage prevents them from being commercialized. Irreversible capacity is capacity loss and is caused by the capture of Li into crystals of the compounds. As a result, the capacity of the secondary battery decreases markedly because only a portion of the lithium supplied from the positive electrode to the negative electrode during the initial charge returns to the positive electrode during a subsequent discharge cycle.

Some of the means for counteracting this irreversible loss of capacity include the method of electrochemically treating the electrodes in advance to replenish irreversible lithium, and of replenishing the irreversible capacity by sticking metallic lithium to the negative electrode. For example, in case of the use of lithium containing silicon oxide as described above, silicon oxide is electrochemically treated in advance during the manufacturing process to include lithium in the oxide. The electrode electrochemical treatment method has an advantage that it is easy to control capacity by adjusting only the charging conditions. However, this method has a disadvantage of complexity and low productivity, because the secondary batteries must be reconstructed after electrodes are charged.

The method of sticking metallic lithium results in natural migration of Li between the oxide and the metallic lithium, both of which are short-circuited by a filling of electrolyte. However, this method has a disadvantage with respect to quality, including variations in secondary battery characteristics and safety due to remaining metallic lithium caused by insufficient migration of lithium, which depends on the shape of the electrodes.

These disadvantages prohibit commercialization of secondary batteries using oxides as the negative electrode although oxides are promising secondary battery materials. Accordingly, there is increasing demand for a simple technique to counteract irreversible capacity without risking secondary battery quality.

SUMMARY OF THE INVENTION

The present invention aims to offer a method for efficiently counteracting the irreversible capacity of a negative electrode employing compounds such as oxides.

The secondary battery of the present invention employs lithium containing composite oxide as a positive electrode material which can intercalate and de-intercalate lithium; and compounds with large irreversible capacity combined with lithium containing composite nitrides as a negative electrode material.

The secondary battery of the present invention further employs lithium containing composite oxides as the positive electrode material which can intercalate and de-intercalate lithium; and metal oxide as the negative electrode. The negative electrode also contains lithium containing composite nitride represented by the formula $Li_{3-x}M_xN$ (M is a transition metal element, $0.2<x\leq0.8$) in addition to the metal oxide. Furthermore, lithium containing composite nitrides including cobalt (Co) as a transition metal element M are preferable because they have high capacity and good reversibility.

For the positive electrode of the secondary battery of the present invention, lithium containing composite oxides such as lithium cobaltate ($LiCoO_2$), lithium nickelate ($LiNiO_2$), their compounds ($LiCo_xNi_yO_2$, x+y=1) and lithium manganate ($LiMn_2O_4$) may be employed.

DESCRIPTION OF THE PREFERRED EMBODIMENT

Figure 1:
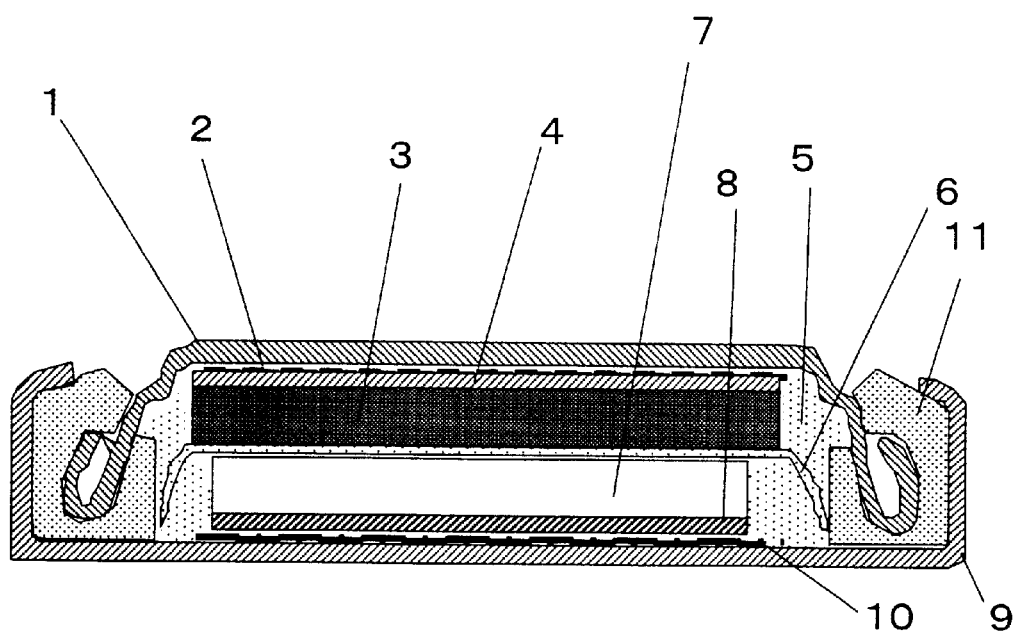
FIG. 1 is a sectional view of a coin type test battery.

A detailed configuration of the present invention is given below.

The present invention relates to an active material for the negative electrode of a secondary battery. Its basic function is to counteract the irreversible capacity characteristic of the oxides used for the negative electrode by lithium in lithium containing composite nitrides. The present invention is also applicable to materials other than oxides which until now, have not been practically used due to their large irreversible capacity. Large irreversible capacity materials include metal halides and metal sulfides. In the following, the present invention is described referring to metal oxides.

The negative electrode of the present invention is made of oxide powder, which is the main active material, lithium containing composite nitride powder, carbon powder and binder resin. The negative electrode is formed of a mixture of these materials. Solvent is then added to the electrode mixture and kneaded to make a paste. After applying the paste to a metal foil such as copper foil, the foil is dried and rolled into an electrode sheet. Alternatively, other conventional manufacturing methods are employed to process the electrode sheet, such as by directly pressing the electrode mixture to form the electrode plate. A lithium negative electrode manufactured as described above may be combined with a positive electrode made of lithium containing composite oxide, and secondary batteries are fabricated using conventional methods.

Lithium is electrochemically replenished to the metal oxide in the negative electrode after the secondary battery is assembled and filled with electrolyte. In the negative electrode, the metal oxide and lithium containing composite nitride constitute a local battery via conductive materials. This configuration automatically causes migration of lithium from the lithium containing composite nitride to the metal oxide, when the metal oxide has a higher reactive potential than that of the lithium containing composite nitride. If the metal oxide has a lower reactive potential than that of the lithium containing composite nitride, lithium is supplied from the positive electrode to the metal oxide during initial charge. In this case, insufficient lithium returning to the positive electrode in the subsequent discharge (irreversible capacity) is replenished from the lithium containing composite nitride to the positive electrode. At last, irreversible capacity is completely counteracted by equivalent replenishment from the lithium containing composite nitride. Furthermore, after the initial discharge, the positive electrode is filled with the lithium, and the positive electrode returns to the initial "discharge" state. Capacity equivalent to irreversible capacity is also replenished to the metal oxide in the negative electrode, and thus the negative electrode is also in the "discharge" state. The lithium containing composite nitride is also in the "discharge" state because lithium equivalent to the aforementioned irreversible capacity is released.

Accordingly, the configuration of the present invention enables the use of a variety of metal oxides which up to now have not been employable due to their irreversible capacity in spite of having a large reversible capacity.

The present invention employs lithium containing composite oxide which has a high potential of about 4 V such as an oxide represented by $LiCoO_2$ for the positive electrode. For securing high secondary battery voltage, it is preferable to employ oxides with a low potential as low as possible for the negative electrode. For example, tungsten oxides represented by the general formula of $WO_x$ such as $WO_3$ and $WO_2$; tin oxides represented by the general formula of $SnO_x$ such as $SnO_2$ and $SnO$; silicon oxides represented by the general formula of $SiO_x$ such as $SiO$; iron oxides represented by the general formula of $FeO_x$ such as $Fe_2O_3$, $Fe_3O_4$, and $FeO$; lead oxides represented by the general formula of $PbO_x$ such as $PbO$, $PbO_2$, $Pb_3O_4$, and $Pb_2O_3$; vanadium oxides represented by the general formula of $VO_x$ such as $VO$, $V_2O_3$, $V_2O_5$, and $VO_2$; germanium oxides represented by the general formula of $GeO_x$ such as $GeO$ and $GeO_2$; cobalt oxides represented by the general formula of $CoO_x$ such as $CoO$, $CO_2O_3$, and $Co_3O_4$; composite metal oxides consisting of several metals represented by the general formula of $A_xB_yO_z$ (A and B are different types of at least one element in the following list: W, Sn, Pb, Si, Nb, V, Ge, Fe, Cu, Ni, Co, Bi, Sb, P, Al, Ti In, Zn, and Mn; and x, y and z are numbers determining the relative composition of a metal oxide) such as $SnSiO_3$, $SnSi_2O_5$, $SnGe_2O_5$, $SnPb_2O_5$, and $PbGeO_3$; and other metal oxides and composite metal oxides to which alkali metals such as Na, Li, K, and Rb or alkaline earth metals such as Ca, Mg, Sr, and Ba are added.

For the negative electrode of the present invention, a lithium containing composite nitride with high capacity and good charge-discharge reversibility is employed so that both metal oxide and lithium containing composite nitride may be utilized as active materials in charge-discharge cycles in order to achieve a higher capacity secondary battery.

In particular, lithium containing composite nitrides with high capacity and good charge-discharge reversibility include those represented by the general formula of $Li_{3-x}M_xN$ in which a portion of Li in lithium nitride ($Li_3N$) is substituted by a transition metal (M) such as Cu, Fe, Mn, Co, or Ni. Those which have substitution amount of $0.2 < X \leq 0.8$ demonstrate high capacity. Furthermore, lithium containing composite nitrides represented by the general formula of $Li_{3-x}Co_xN$ using cobalt as the transition metal demonstrates particularly good charge-discharge reversibility. The present invention basically employs the above lithium containing composite nitride. The lithium containing composite nitride in the negative electrode shows strong reactivity with water, and deteriorates by reaction with water. It is thus preferable to employ highly dehydrated solvent for making paste.

The positive electrode and negative electrode employed in the present invention are manufactured by applying an electrode mixture to the surface of a collector. The following lithium containing composite oxides are effective as materials for the positive electrode in the present invention: $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_2$, $Li_xMn_2O_4$, $Li_xMn_{2-y}M_yO_4$ (at least one type chosen from M=Ti, V, Mn, Mg, Zr, Na, Mg, Sc, Y, Fe, Co, Ni, Ti, Zr, Cu, Zn, Al, Pb, Sb, B). Here, X=0–1.2, y=0–0.9, z=2.0–2.3. The value x in the above formula is the value before starting charge and discharge, and thus changes as charge and discharge take place.

The non-aqueous electrolyte employed in the present invention consists of non-aqueous solvent and lithium salt. As for non-aqueous solvents, it is preferable to employ a mixture of cyclic carbonates such as ethylene carbonate (EC), propylene carbonate (PC), butylene carbonate (BC), and vinylene carbonate (VC); with acyclic carbonates such as di-methyl carbonate (DMC), diethyl carbonate (DEC), ethyl methyl carbonate (EMC), and di-propyl carbonate (DPC); or a mixture of cyclic carbonates, acyclic carbonates with aliphatic carboxylic acid ester such as methyl formate, methyl acetate, methyl propionate, and ethyl propionate.

The lithium salt to be dissolved in such solvents is preferably $LiPF_6$. The volume ratio of lithium salt dissolved in non-aqueous solvent is not particularly limited, but is preferably 0.2 to 2 mol/l and ideally between 0.5 to 1.5 mol/l.

As for the collector for the positive electrode, stainless steel or aluminum in the form of a net, sheet, foil, or lath may be used. For the collector for the negative electrode, stainless steel or copper in the form of a net, sheet, foil, or lath may be used.

As for the electrode mixture used for the positive electrode or negative electrode, acetylene black or graphite may be mixed in as a conductive material. For the binder in the electrode mixture, fluorine containing thermoplastic compounds such as poly-vinylidene fluoride or poly-tetrafluoro ethylene, and elastomers such as acrylic ester polymer, styrene butadiene rubber, or ethylene propylene terpolymer may be used independently or mixed. For the separator between electrodes, polypropylene, polyethylene, or their copolymers may be used independently or in combination.

The secondary battery may have any shape including a cylindrical, coin type, sheet type, or square type. It is preferable to provide means for securing safety in case of malfunction of the secondary batteries such as an internal pressure release safety valve, current cut safety valve, and separator that increases resistance at high temperature.

Exemplary embodiments of the present invention are detailed next.

First Exemplary Embodiment

An example of the use of SiO as a material for the negative electrode is described next.

A first exemplary embodiment employs commercially available reagent SiO powder.

The charge-discharge performance of SiO was confirmed in advance using a test battery with metallic lithium as an opposite electrode. The initial Li charging capacity of SiO was about 2500 mAh/g, but only about 1500 mAh/g was discharged in the next discharge, revealing that the irreversible capacity of SiO was about 1000 mAh/g. The specific gravity of SiO is about 2.0 g/cc, which is equivalent to graphite. Accordingly, this material is also suitable with respect to capacity per unit volume.

As for lithium containing composite nitride, $Li_{2.5}Co_{0.5}N$ was used. Since $Li_{2.5}Co_{0.5}N$ is not available on the market, it was made as follows.

Lithium nitride ($Li_3N$) powder, a commercially available reagent, and metallic cobalt (Co) powder, also a commercially available reagent, were mixed at a predetermined ratio. The mixture was poured into a copper crucible, and fired 8 hours at 700° C. in a nitrogen atmosphere. After reaction takes place, a gray-black compound was obtained as sintered material. The sintered material was then ground to be lithium containing composite nitride powder. The whole processes from mixing to grinding were implemented in a low-moisture (dew condensation point: −20° C. or below) high purity nitrogen atmosphere (oxygen: 100 ppm or below). A powder x-ray diffraction analysis of the resulting lithium containing composite nitride powder showed a $Li_{2.5}Co_{0.5}N$ to have a hexagonal structure, the same as lithium nitride ($Li_3N$), and showed no impurity peaks.

The charge-discharge performance of $Li_{2.5}Co_{0.5}N$ was also confirmed in advance. The initial Li discharge capacity of $Li_{2.5}Co_{0.5}N$ was about 800 mAh/g, and the subsequent charge was 800 mAh/g without capacity loss. Repeated charge and discharge took place without loss, maintaining reversible capacity of 800 mAh/g.

$Li_{2.5}Co_{0.5}N$ has a specific gravity of about 2.0 g/cc, which is equivalent to graphite, and is also preferable with respect to capacity per unit volume.

FIG. 1 is a schematic sectional view illustrating a coin type test battery made for comparing cycle characteristics of the lithium secondary battery of the present invention. In FIG. 1, a nickel net 2 was welded onto the inner face of a stainless steel battery cap 1. The negative electrode 3 containing SiO and $Li_{2.5}Co_{0.5}N$ was formed on a copper foil 4. The copper foil 4 and nickel net 2 were electrically connected by pressing them together. Organic electrolyte 5 was made by dissolving 1 ml/l of $LiPF_6$ in a solvent mixture containing EC and DEC at a volume ratio of 1:1.

A porous separator 6 made of polyethylene was used for the test battery. The positive electrode 7 used $LiCoO_2$ as the active material, and was fabricated by punching a disk after applying the positive electrode mixture on an aluminum foil 8 to form positive electrode sheet. A stainless steel net 10 was welded onto the inner face of a positive electrode case 9 made of stainless steel. Also in this case, the positive electrode aluminum foil 8 and stainless steel net 10 were electrically connected by pressing them together. A gasket 11 creates an electrically insulation between the battery cap 1 and positive electrode case 9. A gasket 11 also functions as a sealant for the contents of the secondary battery when the rim of the positive electrode case 9 is bent inwards and caulked.

In the above secondary battery, the negative electrode containing SiO and $Li_{2.5}Co_{0.5}N$ was fabricated as follows.

SiO powder, $Li_{2.5}Co_{0.5}N$ powder, carbon powder, and styrene butadiene synthetic rubber (SBR resin) were mixed at a weight ratio of 35:45:18:12, and dispersed in dehydrated toluene to fabricate slurry. The slurry was applied on a copper foil (18 $\mu$m thick), the negative electrode collector, using the doctor blade; dried, and rolled to complete the negative electrode sheet. A 16 mm diameter disk electrode was then punched from the negative electrode sheet. The mixing ratio of the above SiO powder and $Li_{2.5}Co_{0.5}N$ powder was set to replenish the irreversible capacity of SiO by discharge capacity of $Li_{2.5}Co_{0.5}N$.

$LiCoO_2$ powder, carbon powder, and poly-vinylidene fluoride were mixed at a weight ratio of 85:10:5, and dispersed in dehydrated N-methyl pyrolydinone to fabricate slurry, and then applied on an aluminum foil (20 $\mu$m thick), the positive electrode collector, using the doctor blade. The aluminum foil was then dried and rolled to complete a positive electrode sheet. A 15 mm diameter positive electrode disk was punched from the positive electrode sheet.

About 0.5 g of $LiCoO_2$, the positive active material, was contained in this secondary battery, and the negative active material comprising 0.024 g of SiO and 0.030 g of $Li_{2.5}Co_{0.5}N$ were contained in this secondary battery.

Figure 2:
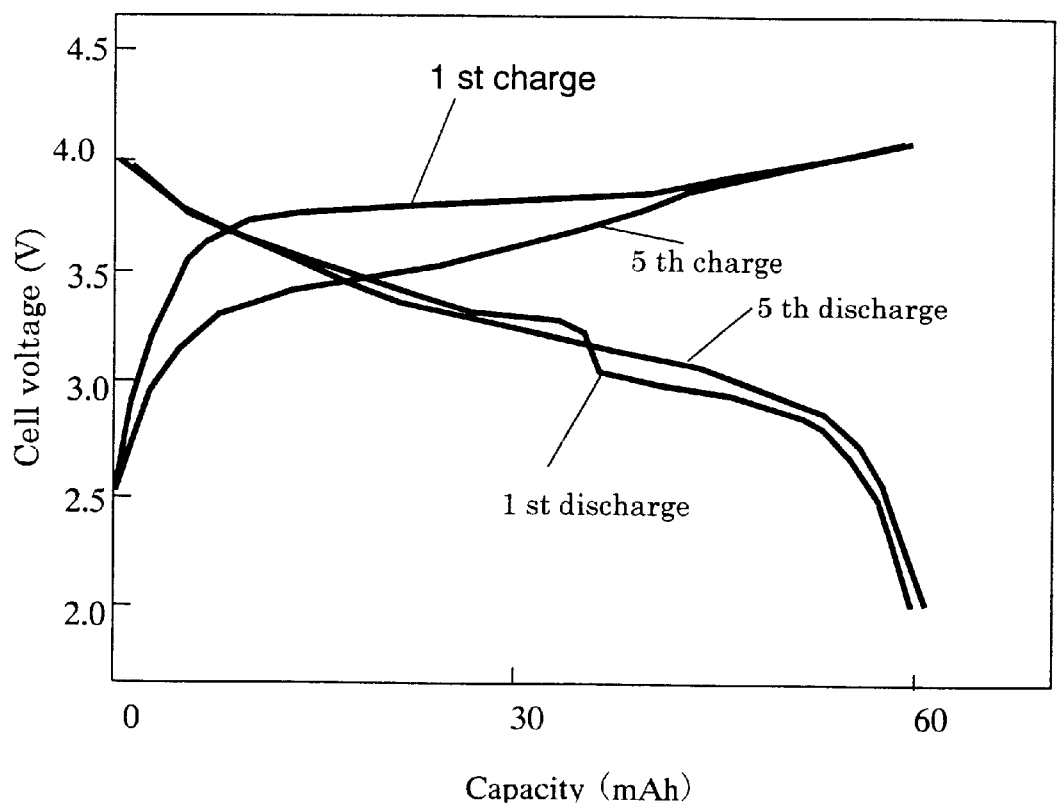
FIG. 2 is a charge-discharge characteristics of the test battery in accordance with a first exemplary embodiment.

The charge-discharge test of the secondary battery fabricated as above was implemented at 1 mA constant current. The upper limit charge voltage was set to 4.1 V, and the lower limit discharge voltage was set to 2.0 V. FIG. 2 shows the charge and discharge characteristics of the secondary battery in this test. The average discharge voltage was about 3.2 V, and the discharge capacity was about 60 mAh. The secondary battery test started from charging. Initial charge capacity (1st charge curve in FIG. 2) and initial discharge capacity (1st discharge curve in FIG. 2) were almost the same, indicating that any irreversible capacity of SiO was being effectively replenished from the $Li_{2.5}Co_{0.5}N$. FIG. 2 shows the charge characteristic (5th charge) and discharge characteristic (5th discharge) of the fifth cycle. There was almost no difference between the initial charge-discharge capacity and that in the fifth cycle. Both SiO and $Li_{2.5}Co_{0.5}N$ were functioning as active materials and showed good cycle reversibility. Though, the initial charge-discharge voltage and that in the fifth cycle were significantly different, the second and subsequent cycles show almost the same profile as that of the fifth cycle. Only the initial charge-discharge shows different behavior which is thought to be due to the reactive potential of SiO being lower than the reactive potential of $Li_{2.5}Co_{0.5}N$, causing no involvement of $Li_{2.5}Co_{0.5}N$ in the initial charge. In addition, it is thought $Li_{2.5}Co_{0.5}N$ changes to an amorphous structure during the initial discharge, and this may also be a factor of changing the voltage profile.

Next, the capacity density per unit weight of each active material for the positive and negative electrodes was calculated. Results indicated that the capacity density of $LiCoO_2$ as the positive active material was about 120 mAh/g.

On the other hand, the capacity density of the negative active material was about 1110 mAh/g when a mixed active material of SiO and $Li_{2.5}Co_{0.5}N$ were considered as a single active material. Since the capacity density of carbon material in the negative electrode of existing commercialized lithium-ion secondary batteries is about 300 to 370 mAh/g, the present invention has provided a secondary battery with much greater capacity.

For comparison, a secondary battery using only SiO for the negative active material and $LiCoO_2$ for the positive electrode and a secondary battery using only $Li_{2.5}Co_{0.5}N$ for the negative active material and $LiCoO_2$ for the positive electrode were fabricated. The secondary battery using only SiO for the negative electrode showed extremely large irreversible capacity, resulting in small charge-discharge reversible capacity. The secondary battery using only $Li_{2.5}Co_{0.5}N$ for the negative electrode was unable to undergo charge and discharge due to inappropriate electrochemical conditions. However, such secondary batteries using only SiO or $Li_{2.5}Co_{0.5}N$ as the negative electrode may also be feasible if irreversible capacity is replenished electrochemically in advance or Li is electrochemically released in advance. However, such processing will make manufacturing processes extremely complicated, and assurance of quality may also be difficult.

The first exemplary embodiment refers to a secondary battery using $Li_{2.5}Co_{0.5}N$ as lithium containing composite nitride. The same tests were implemented on secondary batteries using other types of lithium containing composite nitrides. The same results as in the above exemplary embodiment were achievable with lithium containing composite nitrides satisfying the formula of $Li_{3-x}M_xN$ (M is a transition metal, $0.2<X\leq0.8$).

Second Exemplary Embodiment

The use of $SnSiO_3$ as the negative electrode material is described next.

$SnSiO_3$ was fabricated by dry mixing 2.7 g of SnO and 1.2 g of $SiO_2$, and firing the mixture in a crucible for 10 hours at 1000° C. in an argon atmosphere. The mixture was then rapidly cooled by pouring it into a metal vessel in an argon atmosphere. This material was then ground to create $SnSiO_3$ powder for use as electrode material. X-ray diffraction analysis revealed this metal oxide to have an amorphous structure.

The charge-discharge characteristics of $SnSiO_3$ was confirmed in advance. The initial Li charge capacity of $SnSiO_3$ was about 1100 mAh/g, but the subsequent discharge capacity was only about 600 mAh/g, revealing about 500 mAh/g of irreversible capacity. Repeated charge and discharge took place with 600 mAh/g of reversible capacity. $SnSiO_3$ has a specific gravity of about 4 g/cc, which is extremely preferable with respect to capacity per unit volume.

Other components were the same as the first exemplary embodiment, including $Li_{2.5}Co_{0.5}N$, and a coin type test battery shown in FIG. 1 were used for evaluation. For the positive electrode, $LiCoO_2$ was used in the test battery.

In the above test battery, the negative electrode containing $SnSiO_3$ and $Li_{2.5}Co_{0.5}N$ was fabricated as follows.

$SnSiO_3$ powder, $Li_{2.5}Co_{0.5}N$ powder, carbon powder, and SBR resin were mixed at a weight ratio of 30:50:18:2, and dispersed in dehydrated toluene to fabricate slurry. The slurry was applied on a copper foil (18 μm thick), the negative electrode collector, using the doctor blade; dried, and rolled to complete the negative electrode sheet. A 16 mm diameter disk electrode was then punched from the negative electrode sheet. The mixing ratio of the above $SnSiO_3$ powder and $Li_{2.5}Co_{0.5}N$ powder was set to replenish the irreversible capacity of $SnSiO_3$ by discharge capacity of $Li_{2.5}Co_{0.5}N$.

About 0.5 g of $LiCoO_2$, and the negative active material comprising 0.048 g of $SnSiO_3$ and 0.030 g of $Li_{2.5}Co_{0.5}N$ were contained in this secondary battery.

Figure 3:
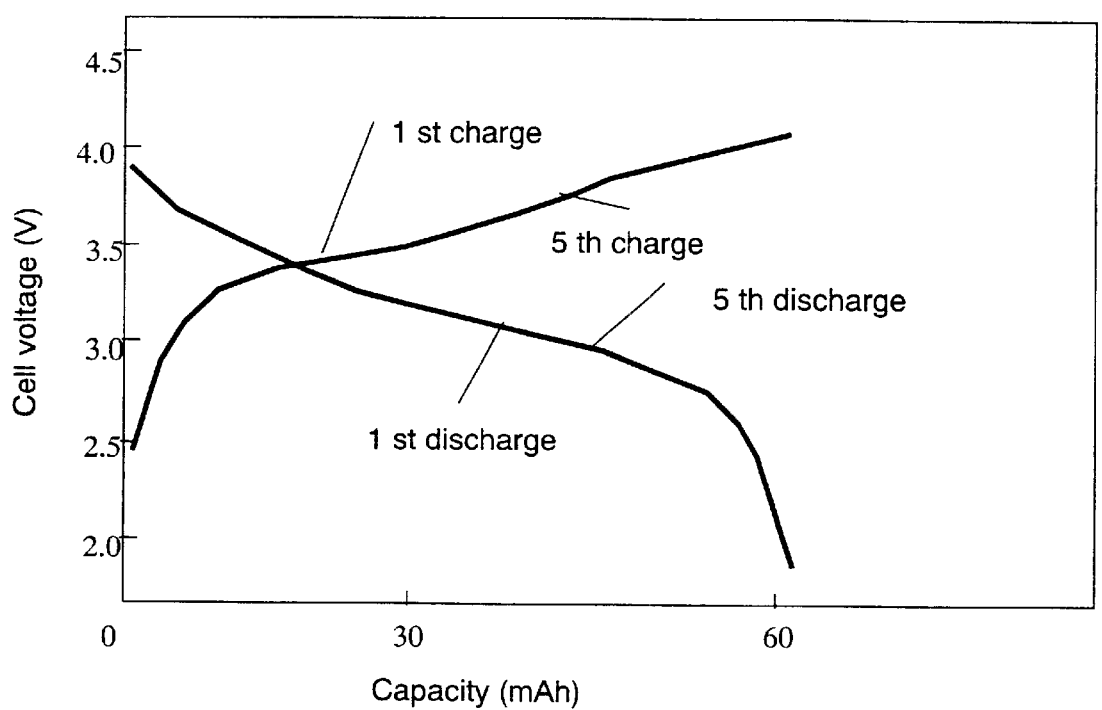
FIG. 3 is a charge-discharge characteristics of the test battery in accordance with a second exemplary embodiment.

The charge-discharge test of the secondary battery fabricated as above was implemented in the same way as the first exemplary embodiment. FIG. 3 shows the charge-discharge characteristics of the secondary battery in this test. The average discharge voltage was about 3.1 V, and the discharge capacity was about 60 mAh. This secondary battery also starts from charging, and there was almost no difference between the initial charge capacity (first cycle) and initial discharge capacity, indicating that any irreversible capacity of $SnSiO_3$ was being effectively replenished from $Li_{2.5}Co_{0.5}N$. FIG. 3 shows the charge characteristic and discharge characteristic during the fifth cycle. There was almost no difference to the initial capacity. Both $SnSiO_3$ and $Li_{2.5}Co_{0.5}N$ were functioning as active materials and showed good cycle reversibility. However, no clear change in a voltage profile due to a change to an amorphous structure in $Li_{2.5}Co_{0.5}N$, as shown in FIG. 2, was observed in this exemplary embodiment. This is considered that, unlike SiO, Li has migrated automatically by filling electrolyte because reactive voltage of $SnSiO_3$ is higher than reactive potential of $Li_{2.5}Co_{0.5}N$, and a change to an amorphous state has taken place before charge and discharge start.

Next, the capacity density per unit weight of each active material for the positive and negative electrodes was calculated. Results indicated that the capacity density of $LiCoO_2$ as the positive active material was about 120 mAh/g.

On the other hand, the capacity density of the negative active material was about 775 mAh/g when a mixed active material of $SnSiO_3$ and $Li_{2.5}Co_{0.5}N$ were considered as a single active material. Since the capacity density of carbon material in the negative electrode of existing commercialized lithium-ion secondary batteries is about 300 to 370 mAh/g, the present invention has provided a secondary battery with much greater capacity per unit volume. Considering specific gravity of the material, the second exemplary embodiment further has large effect on higher capacity per unit volume.

For comparison, a secondary battery using only $SnSiO_3$ for the negative active material and $LiCoO_2$ for the positive electrode was fabricated. The secondary battery using only $SnSiO_3$ for the negative electrode showed extremely large irreversible capacity, resulting in negligible charge-discharge reversible capacity. However, such secondary battery using only $SnSiO_3$ for the negative electrode may also be feasible if irreversible capacity is replenished electrochemically in advance. However, such processing will make manufacturing processes extremely complicated, and assurance of quality may also be difficult.

Third Exemplary Embodiment

The use of $Ba_{0.9}Sr_{0.1}SnO_3$ as the negative electrode material is described next.

An oxide $Ba_{0.9}Sr_{0.1}SnO_3$ was also fabricated by mixing SnO, $BaO_2$, and SrO at a predetermined ratio, and firing the mixture in a crucible. The mixture was then ground to create $Ba_{0.9}Sr_{0.1}SnO_3$ powder for use as electrode material. This material had a crystalline structure The charge-discharge performance of $Ba_{0.9}Sr_{0.1}SnO_3$ was confirmed in advance. (Metallic lithium was used as an opposite electrode, and capacity characteristics were confirmed by the test battery.) The initial Li charging capacity of $Ba_{0.9}Sr_{0.1}SnO_3$ was about 600 mAh/g, but the subsequent discharging capacity was only about 230 mAh/g, revealing about 370 mAh/g of irreversible capacity. Repeated charge and discharge took place with 230 mAh/g of reversible capacity, leaving 370 mAh/g loss of lithium. Although irreversible capacity of 230 mAh/g is lower than that of graphite, its practical filling capacity is significantly large with respect to capacity per unit volume because a specific gravity of $Ba_{0.9}Sr_{0.1}SnO_3$ is about 7 g/cc.

Other components were the same as the first exemplary embodiment, including $Li_{2.5}Co_{0.5}N$, and a coin type test battery shown in FIG. 1 was used for evaluation. For the positive electrode, $LiCoO_2$ was employed in the test battery.

In the above test battery, the negative electrode containing $Ba_{0.9}Sr_{0.1}SnO_3$ and $Li_{2.5}Co_{0.5}N$ was fabricated as follows.

$Ba_{0.9}Sr_{0.1}SnO_3$ powder, $Li_{2.5}Co_{0.5}N$ powder, carbon powder, and SBR resin were mixed at a weight ratio of 54:26:18:2 and dispersed in dehydrated toluene to fabricate slurry. The slurry was applied on a copper foil (18 $\mu$m thick), using the doctor blade; dried, and rolled to complete the negative electrode sheet. A 16 mm diameter disk electrode was then punched from this negative electrode sheet. The mixing ratio of the above $Ba_{0.9}Sr_{0.1}SnO_3$ powder and $Li_{2.5}Co_{0.5}N$ powder was set to replenish the irreversible capacity of $Ba_{0.9}Sr_{0.1}SnO_3$ by discharge capacity of $Li_{2.5}Co_{0.5}N$.

About 0.5 g of $LiCoO_2$, and the negative active material comprising 0.066 g of $Ba_{0.9}Sr_{0.1}SnO_3$ and 0.030 g of $Li_{2.5}Co_{0.5}N$ were contained in this secondary battery.

Figure 4:
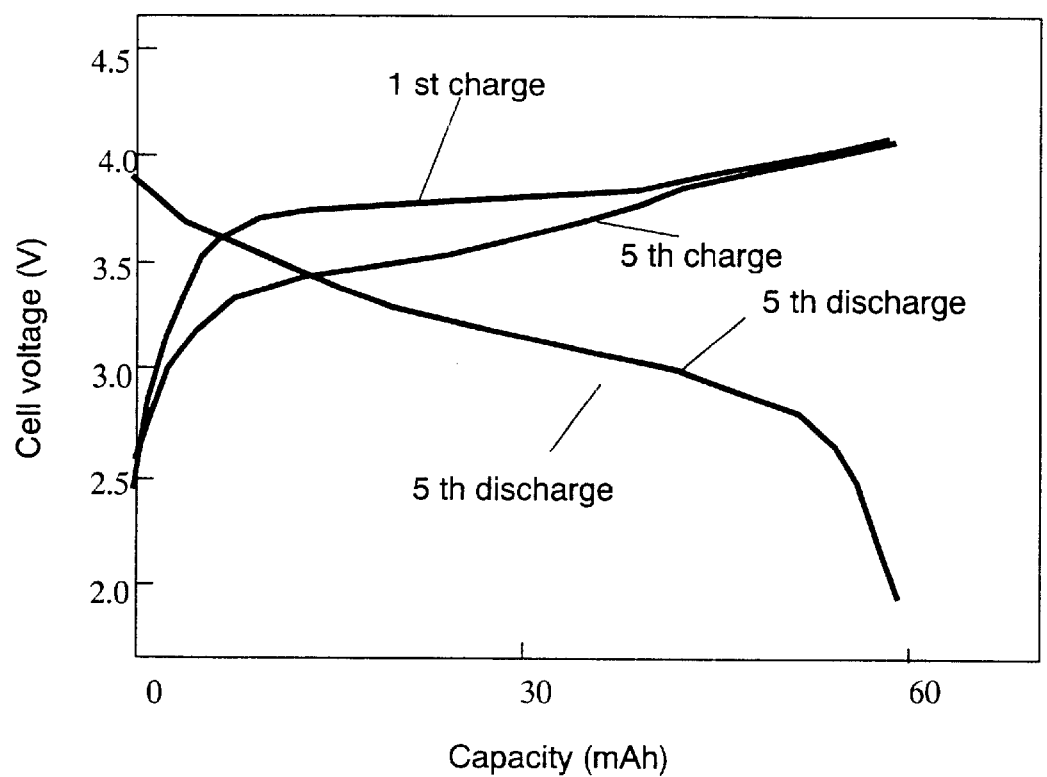
FIG. 4 is a charge-discharge characteristics of the test battery in accordance with a third exemplary embodiment.

The charge-discharge test of the secondary battery fabricated as above was implemented in the same way as the first exemplary embodiment. FIG. 4 shows the charge and discharge characteristics of the secondary battery in this test. The average discharge voltage was about 3.1 V, and the discharge capacity was about 60 mAh. This secondary battery also starts from charging, and there was almost no difference between the initial charge capacity and initial discharge capacity, indicating that any irreversible capacity of $Ba_{0.9}Sr_{0.1}SnO_3$ was being effectively replenished from $Li_{2.5}Co_{0.5}N$. FIG. 4 also shows the charge characteristic and discharge characteristic during the fifth cycle. There was almost no difference to the initial capacity. Both $Ba_{0.9}Sr_{0.1}SnO_3$ and $Li_{2.5}Co_{0.5}N$ were functioning as active materials and showed good cycle reversibility. However, a change in a voltage profile due to the change to an amorphous structure in $Li_{2.5}Co_{0.5}N$, same as in FIG. 2, was observed. This may be caused by lower reactive potential of $Ba_{0.9}Sr_{0.1}SnO_3$ than that of $Li_{2.5}Co_{0.5}N$, same as SiO.

Next, the capacity density per unit weight of each active material for the positive and negative electrodes was calculated. Results indicated that the capacity density per unit weight of $LiCoO_2$ as the positive active material was about 120 mAh/g, same as in the first exemplary embodiment.

On the other hand, the capacity density of the negative active material was about 620 mAh/g when a mixed active material of $Ba_{0.9}Sr_{0.1}SnO_3$ and $Li_{2.5}Co_{0.5}N$ were considered as a single active material. Since the capacity density of carbon material in the negative electrode of existing commercialized lithium-ion secondary batteries is about 300 to 370 mAh/g, the present invention has provided a secondary battery with much greater capacity. Considering specific gravity of the material, the third exemplary embodiment further has large effect on higher capacity per unit volume.

For comparison, a secondary battery using only $Ba_{0.9}Sr_{0.1}SnO_3$ for the negative active material and $LiCoO_2$ for the positive electrode was fabricated. The secondary battery using only $Ba_{0.9}Sr_{0.1}SnO_3$ for the negative electrode showed extremely large irreversible capacity, resulting in negligible charge-discharge reversible capacity. However, such secondary battery using only $Ba_{0.9}Sr_{0.1}SnO_3$ for the negative electrode may also be feasible if irreversible capacity is replenished electrochemically in advance. However, such processing will make manufacturing processes extremely complicated, and assurance of quality may also be difficult.

The above exemplary embodiments refer to secondary batteries employing SiO, $SnSiO_3$, and $Ba_{0.9}Sr_{0.1}SnO_3$ as metal oxides respectively. The present invention may also be basically applied to many other materials which up to now have been impossible to employ due to irreversible capacity. Such materials include the aforementioned tungsten oxide, iron oxide, niobium oxide, cobalt oxide, silicon oxide, oxides containing vanadium, composite oxides containing tin, germanium, or silicon, and amorphous metal oxides containing tin, lead, or silicon. The present invention may still further be applied to materials other than metal oxides, such as metal halides and metal sulfides, which up to now have not been practically used due to their large irreversible capacity.

In other words, the key point of the present invention is the use of the combination of an oxide and a nitride for the negative electrode material in order to replenish the irreversible capacity. This has the significant effect of allowing the exploitation of the theoretically large reversible capacity of nitrides and oxides. This principle may be applied not only to metal oxides but also to other compounds.

As described above, the present invention provides a high quality non-aqueous electrolyte secondary battery using lithium containing composite oxides for the positive electrode which has large capacity and good cycle reversibility by adding lithium containing composite nitrides to the negative electrode.

What is claimed is:

1. A non-aqueous electrolyte secondary battery comprising:
   a positive electrode containing a lithium containing compound which intercalates and de-intercalates lithium; and
   a negative electrode containing
   i) a compound which has irreversible capacity of not less than 300 mAh/g at the initial charge and discharge, and
   ii) lithium containing composite nitride represented by the general formula of $Li_{3-x}M_xN$.

2. A non-aqueous electrolyte secondary battery comprising:
   a positive electrode containing a lithium containing composite oxide which intercalates and de-intercalates lithium; and
   a negative electrode containing
   i) metal oxide, and
   ii) lithium containing composite nitride represented by the general formula of $Li_{3-x}M_xN$
   (M is a transition metal, $0.2 < x \leq 0.8$).

3. The non-aqueous electrolyte secondary battery as defined in claim 2, wherein said lithium containing composite oxide is at least one of lithium cobaltate ($LiCoO_2$), lithium nickelate ($LiNiO_2$) and their composite compound ($LiCo_xNi_yO_2$, $x+y=1$), and lithium manganate ($LiMn_2O_4$).

4. The non-aqueous electrolyte secondary battery as defined in claim 2, wherein M of said lithium containing composite nitride represented by the general formula of $Li_{3-x}M_xN$ (M is a transition metal, $0.2 < x \leq 0.8$) is cobalt (Co).

* * * * *

UNITED STATES PATENT AND TRADEMARK OFFICE
CERTIFICATE OF CORRECTION

PATENT NO. : 6,410,188 B1  Page 1 of 1
DATED : June 25, 2002
INVENTOR(S) : Takayuki Shirane et al.

It is certified that error appears in the above-identified patent and that said Letters Patent is hereby corrected as shown below:

Title page,
Item [54], Title, delete "NON-AQUEOUS ELECTROLYTE SECONDARY CELL", and insert -- NON-AQUEOUS ELECTROLYTE SECONDARY BATTERY --.

Column 12,
Line 23, delete "$0.2<x\square0.8$" and insert -- $0.2<x\leqq0.8$ --.

Signed and Sealed this

Twenty-ninth Day of April, 2003

JAMES E. ROGAN
*Director of the United States Patent and Trademark Office*